Patented Feb. 4, 1941

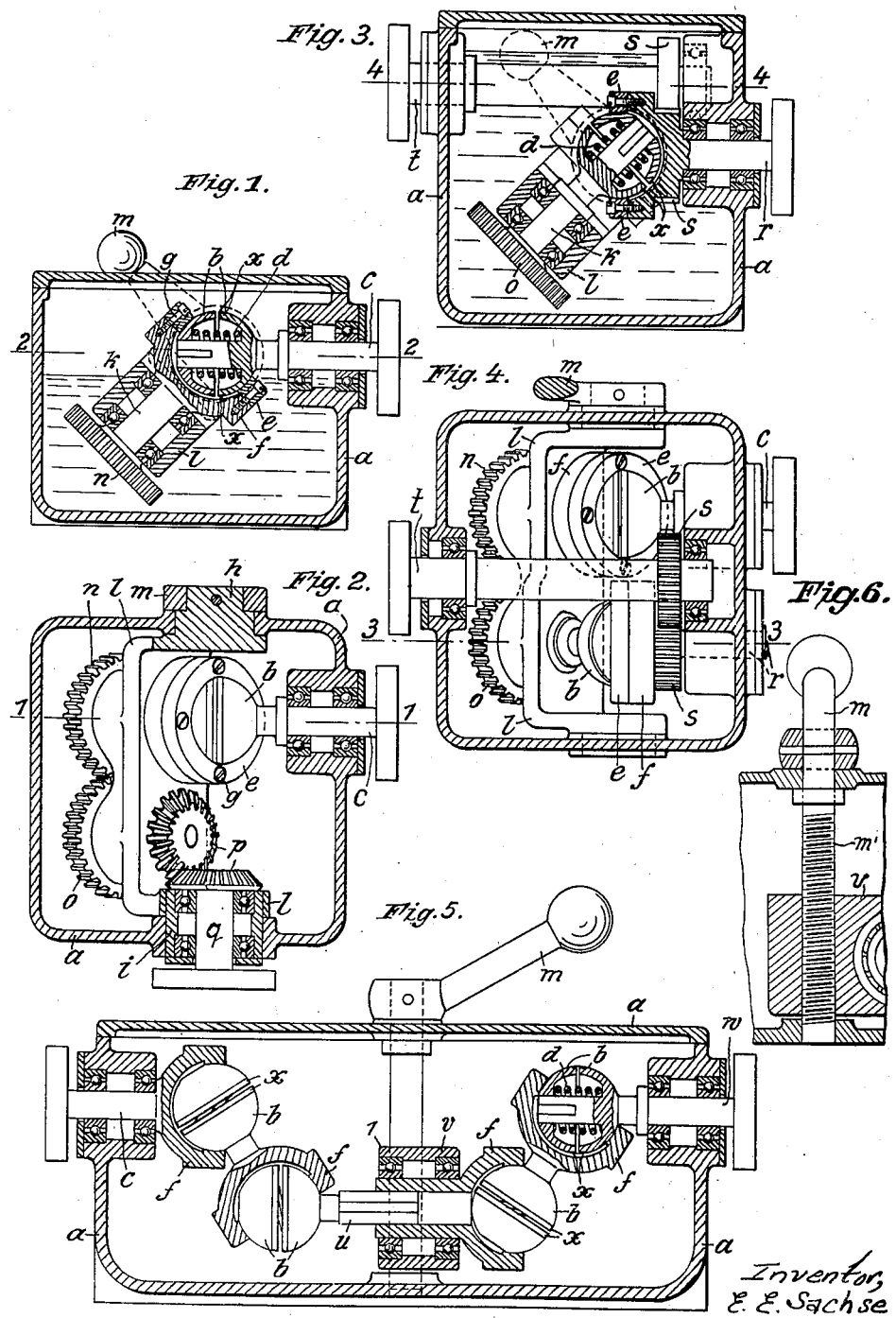

2,230,627

UNITED STATES PATENT OFFICE 2,230,627

CHANGE SPEED GEAR OF THE FRICTION TYPE

Ernst Erich Sachse, Pegau, near Leipzig, Germany, assignor to Hans Joachim Michalk, Dresden, Germany Application July 7, 1939, Serial No. 283,299
In Germany July 15, 1938

5 Claims. (Cl. 74—198)

In change speed gears with continuous change of the power transmission spherical shells are used as frictional bodies, which lie only on one side of the axis and therefore subject the shaft to bending stresses. In order to avoid this, one spherical shell is arranged on each shaft end. This however entails a construction of the gear, which occupies much space, as either the power installation, for instance an electric motor or an internal combustion engine, lies between the shells or friction bodies or the power must be taken from the shell or friction body shaft through a complicated system of toothed wheels or wormwheels. This makes it practically impossible, in the case of spherical shells having a size of only a few centimetres to derive the power from the friction body shaft and nevertheless to obtain a sufficient rigidity of the bearings and the wheels. Moreover, there is a considerable application pressure of the friction ring, which leads to bending and vibration of the long friction body shaft.

The present frictional change speed gear also makes use of substantial spherical shells as frictional bodies, according to the invention however a substantially complete sphere is arranged on one shaft end as a frictional body. This sphere is stressed by the friction ring embracing it at opposite places of the sphere-carrying shaft, so that an almost complete equalisation of the oppositely directed forces is obtained in transmitting power. The substantially complete sphere may consist of semi-spherical shells which are forced apart by spring action, in order to obtain a good application pressure for the power transmission. On the other hand the friction ring will be guided on the sphere with clearance at its supporting body, in order to enable it to yield freely and set itself in accordance with the individual stresses. A gear of this kind can be made very small and nevertheless has great efficiency. Through arranging a plurality of spherical friction bodies one behind the other, any desired degree of transmission may be obtained.

The invention is illustrated by way of example in the accompanying drawing, in which Fig. 1 is a vertical section through one example on line 1—1 of Fig. 2.

Fig. 2 is a corresponding view from above, the casing being sectioned on line 2—2 of Fig. 1.

Fig. 3 shows a vertical section on line 3—3 of Fig. 4 through a second constructional example of two spherical friction gears arranged one behind the other.

Fig. 4 is a horizontal section on line 4—4 of Fig. 3 through the casing, the casing being in section and the gear in plan view.

Fig. 5 shows a third example with four spherical friction gears placed one behind the other in a Cardan-like arrangement.

Fig. 6 is a fragmentary vertical central sectional view through Fig. 5.

Two semi-spherical shells $b$ are journalled in the casing $a$ by means of their shaft $c$. One of the semi-spherical shells is axially slidable but non-rotatable on the shaft $c$ and is acted on by a spring $d$ or some other force, which seeks to force the two semi-spherical shells apart. The two semi-spherical shells are embraced by a friction ring $e$ which is held on its supporting body $f$ with clearance by the screws $g$, so that the friction ring $e$ can, by utilising its clearance, set itself with respect to its supporting body $f$. The supporting body $f$ is journalled with its shaft $k$ in a bow-shaped element $l$. The latter is journalled by means of the trunnions $h$, $i$ in the casing $a$, so as to be capable of rocking, and can be swung about these trunnions from the outside with the aid of a handle $m$. From the shaft $k$ the power is transmitted by way of the gear wheel $n$ mounted thereon to the parallel or adjacent gear wheel $o$ and from the latter by way of bevel wheels $p$ to the transmission shaft $q$, from which the power is taken. The power could of course be introduced at the shaft $q$ and be taken off at the shaft $c$, when the gear is used as a step-down gear. The two gear wheels $n$ and $o$ may be of different relative size according to the ratio in which the put-in power is to be transmitted.

By rocking the bow-shaped element $l$ by means of the handle $m$ the friction ring with its supporting body will be correspondingly set on the substantially complete sphere $b$, that is to say to its greatest diameter or to any smaller diameter, thus enabling intermediate speed transmissions to be obtained. The range of regulation is thus equivalent to the range of swing of the bow-shaped element $l$ from the greatest possible speed, when parallel to the shaft $c$, to the smallest speed, when the friction ring $e$ approaches the shaft $c$. The regulating range is only limited by the diameter of the shaft $c$ of the sphere. This is of no importance in practice, however, as the friction surfaces in the immediate neighborhood of the shaft axis no longer give any effective friction. The shaft $q$, which serves as the power output shaft is taken through one trunnion $i$ of the bow-shaped element $l$. The power is thus taken off at right angles to its input at the shaft c.

Greater regulating ranges may be obtained by repeating the friction bodies with the substantially complete sphere.

Such an example is shown in Figs. 3 and 4 for two friction gears arranged in series. On the shaft k of the gear wheel o there is also mounted a substantially complete sphere b which is embraced by the friction ring e. The supporting body f of the latter is journalled with its shaft r in the casing a. The power may be taken from the shaft r of the supporting body f, but might also be taken off by way of transmission gear ss on the opposite side of the casing a at the shaft t. The setting of the speed is effected for both friction gears by means of the same bow-shaped element l.

In the example shown in Fig. 5 four friction gears are arranged one behind the other, the two intermediate ones on the extensible shaft u. The latter is journalled in a bow-shaped element v which can be swung by means of the handle m. The shaft w, from which the power is taken off, is led out of the casing on the same axis as the input shaft c. In this way it is possible, in theory, to obtain a regulating range of 1:16 with four friction bodies, which in practice will give a regulating range from over about 1:12 to 1:14.

In order that the friction ring e need not be divided at the joint of the two hemispheres b, but may be made in a single piece, as shown, the two hemispheres should be flattened at the joint to the extent of the width of the ring e, as indicated at x, so that the ring can be placed without difficulty over the hemispheres. This arrangement may be unhesitatingly adopted, as this place is not utilised in practice for power transmission. Through the friction ring being made in a single piece, it is also possible to obtain greater accuracy.

The shaft m' of the crank m in Figure 5 has a screw thread with which it engages through the bow-shaped element v in which the two shafts u of the lower spheres b are guided in the ball bearings v'. By rotating the shaft m' in either direction, the shafts u are moved toward or away from the shafts c and w whereby the adjustment for the change of speed is effected.

What I claim is:

1. A frictional change speed gear, comprising in combination, a casing, two shafts journalled in the casing, an internal spherical driving member mounted on one of the shafts in said casing and consisting of two resiliently expanded sphere-halves, a frame angularly displaceable in the casing, an outer friction ring axially journalled in the frame and adapted to coact with said sphere-halves with angular displacement, and means to transmit motion from said friction ring to the other shaft in said casing.

2. A frictional change speed gear, comprising in combination, a casing, an internal spherical driving member mounted in said casing and consisting of two resiliently expanded sphere-halves, an angularly displaceable frame in the casing, an outer friction ring axially journalled in the frame and adapted to coact with said sphere-halves with angular displacement, means to swing said frame about an axis across said sphere-halves to change speed, a shaft journalled in the casing, and means to transmit motion from said friction ring to the shaft.

3. A frictional change-speed gear, comprising in combination, a casing, two shafts journalled in the casing, an internal spherical driving member mounted on one of the shafts in said casing and consisting of two resiliently expanded sphere-halves, a frame angularly displaceable in the casing, an outer friction ring axially journalled in the frame and adapted to coact with said sphere-halves with angular displacement, said ring held on its axis with clearance, means to swing said frame about an axis across said sphere-halves to change speed, and means to transmit motion from said friction ring to the other shaft journalled in said casing.

4. A frictional change-speed gear, comprising in combination, a casing, two shafts journalled in the casing, an internal spherical driving member mounted on one of the shafts in said casing and consisting of two resiliently expanded sphere-halves, a frame swingably mounted in the casing, two shafts journalled in the frame in parallel relation, an outer friction ring carried by one of the shafts in the frame and adapted to coact with said sphere-halves with angular displacement, said ring held on its shaft with clearance, means to swing said frame about an axis across said sphere-halves to change speed, and the other shaft in the frame engaging the said ring shaft and the other shaft journalled in the casing.

5. A frictional change speed gear, comprising in combination, a casing, two shafts journalled in the casing, an internal spherical driving member mounted on one of the shafts in said casing and consisting of two resiliently expanded sphere-halves, a frame swingably mounted in the casing, an outer friction ring axially journalled in the frame and adapted to coact with said sphere-halves with angular displacement, flattened parts on the neighboring edges of said sphere-halves, said ring held on its axis with clearance, means to swing said frame about an axis across said sphere-halves to change speed, and means to transmit motion from said friction ring to the other shaft journalled in said casing.

ERNST ERICH SACHSE.